Sept. 6, 1960   E. S. SAMPSON ET AL   2,951,360
THERMAL CONDUCTIVITY TESTING
Filed March 30, 1956
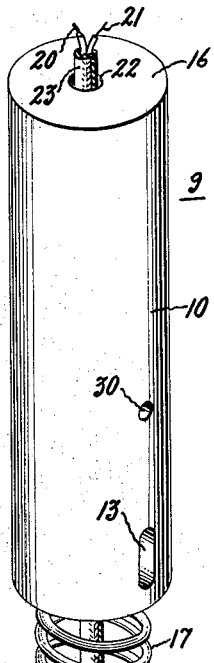
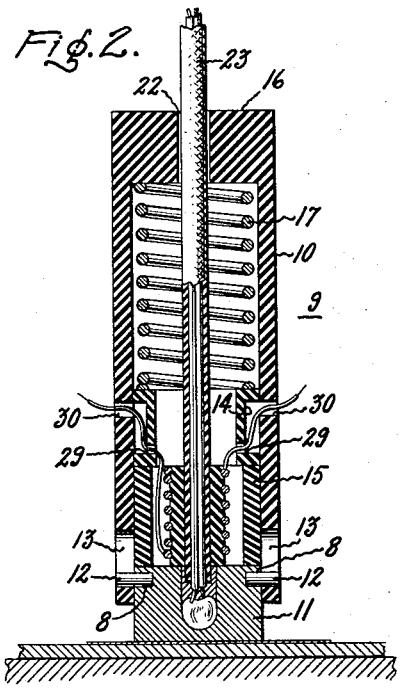
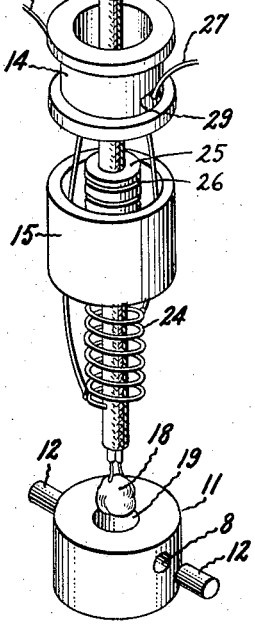
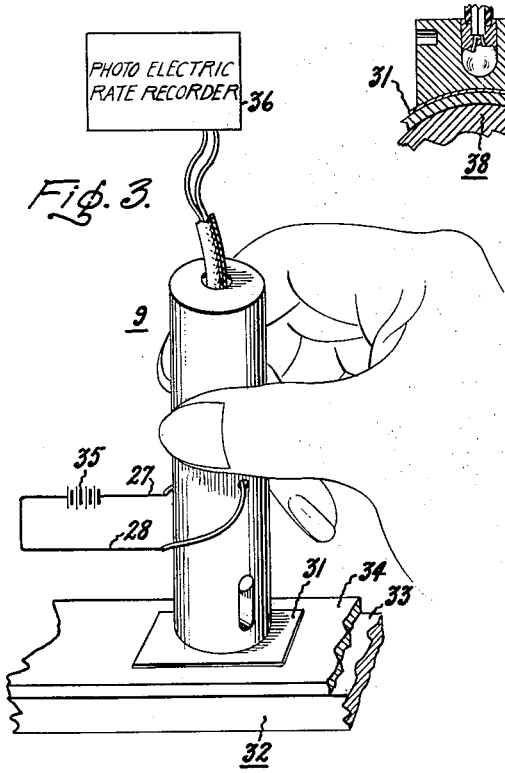
Inventors
Ernest S. Sampson
Roy E. Anderson
by Merton D. Moore
Their Attorney

United States Patent Office 2,951,360
Patented Sept. 6, 1960

2,951,360

THERMAL CONDUCTIVITY TESTING

Ernest S. Sampson and Roy E. Anderson, Schenectady, N.Y., assignors to General Electric Company, a corporation of New York Filed Mar. 30, 1956, Ser. No. 575,235

2 Claims. (Cl. 73—15)

This invention relates to a method and apparatus for testing materials and fabricated parts from a single contact point by measurement of thermal conductivity. For example, this invention is useful for determining the bond quality of such things as the bonding of a thin, hard facing material to a die or a plating on a thicker base material. The invention is also useful for determining the quality of a spot weld or thickness of a known material and for other purposes where the nature of the test being made depends upon the thermal conductivity of a material or materials.

Other probes which utilize the measurement of thermal conductivity of materials for testing such materials have been proposed in the past. However, the problem of providing a means to assure that the pressure between the test probe and the object being tested is the same for every test and the problem of providing a thermal impedance between the test probe and the piece to be tested has never been satisfactorily met. An instrument of this type can never be accurate unless a constant thermal impedance between the probe and the piece to be tested can be obtained.

Accordingly, it is an object of this invention to provide a thermal probe wherein the pressure between the probe and the piece being tested will be constant for every test.

Another object of this invention is to provide such a thermal probe which insures a constant thermal impedance is maintained between the probe and any piece being tested.

A further object of this invention is to provide a method of determining the thermal conductivity of a test piece.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

Fig. 1 is an exploded perspective view of a thermal probe embodying the present invention;

Fig. 2 is a cross-sectional view of such a probe in contact with a piece of material to be tested;

Fig. 3 is a perspective view of such a probe as applied to a test piece; and

Fig. 4 is a broken away sectional view of one type of contact member for a probe embodying this invention.

Briefly stated, in accordance with one aspect of this invention, a method of and apparatus for testing the thermal conductivity of a test piece is provided wherein a test probe having a heated contact member is placed against the test piece, a fluid coupling is provided between the test piece and the contact, and the thermal conductivity of the piece is determined by generating an electric current which varies with the temperature of the contact member and the current so generated is measured.

According to another aspect of this invention the contact member is spring loaded in the test probe in such a manner that a given pressure will be provided between the contact member and any test piece.

Referring specifically to Fig. 1 of the drawing, the testing probe has an outer casing 10 which is provided to hold all of the parts of the probe and which is preferably made of a heat insulating material so that the test probe may be held in the hand. A metallic contact member 11 which is to be placed against a workpiece is held in the lower end of the casing member 10 by means of ear pins 12 which pass through slots 13 on opposite sides of the lower end of the casing 10 and into apertures 8 in the contact member 11. The slots 13 which receive the ear pins 12 are elongated so that the contact member 11 will be movable within the casing along its longitudinal axis.

The remainder of the components of the test probe 9 are provided for the purpose of performing three functions. One such function is to heat the contact member 11 of the probe to a steady state temperature; another such function is to bias the contact member 11 outwardly away from the casing 10 (along its longitudinal axis); and the third operation is to generate an electric current which is proportional to the temperature of the contact member 11. The action of these functions in serving the overall purpose of testing a material by testing its thermal conductivity is explained fully in connection with the operation of the apparatus. However, the apparatus itself is described in detail first.

The biasing of the contact member 11 outwardly away from the casing 10 along its longitudinal axis is accomplished by means of a biasing spring 17 and a pair of spool spacers 14 and 15 of insulating material. The spool spacers are placed end to end on each other and against the top surface of the contact member 11 and have outside diameters such that the spools slide freely within the casing member 10. The biasing spring 17 is held in compression between the upper wall 16 of the casing member 10 and the upper edge of the upper spool 14. This arrangement is clearly illustrated in the cross-sectional view of Fig. 2. It may be seen from this figure that with the parts thus far described assembled, the compression spring 17 biases the two spools 14 and 15 outwardly along the longitudinal axis of the cylindrical casing 10. Since the lower spool 15 is resting on the upper surface of the contact member 11, the contact member 11 is also forced outwardly by the spring 17. The two engaging ears 12 which project through the elongated slots 13 in the outer casing 10 and into the body of the contact member 11 engage the lower end of the elongated slot 13 and thus prevent the contact member 11 from being forced out of the casing 10.

The current generating function is accomplished by a thermocouple 18 which is embedded in a centrally located cavity 19 in the contact member 11. Leads 20 and 21 are brought out from the thermocouple 19 up through the center of the casing member 10 and out through an aperture 22 in the upper backwall 16 of the casing member. In order to hold the lead wires 20 and 21 together and to insulate them from the rest of the apparatus, these wires are surrounded by insulating material 23. The lead wires 20 and 21 may then be connected to a measuring instrument or meter (Fig. 3, item 36) as will be described more fully with regard to the operation of the apparatus.

In order to heat the contact member 11 to a steady state temperature, a spirally wound heating coil 24 is wound on an insulating spacer spool 25 which surrounds the lower end of the thermocouple leads 20 and 21 and is intended to rest on the back surface of the contact member 11. Spiral grooves 26 are provided in the insulating spool 25 to hold the coil heating element 24 in place. Leads 27 and 28 are connected from the heating coil 24 and are provided for the purpose of supplying and energizing voltage to the heating coil 24. Leads 27 and 28 are brought out from the casing 10 through apertures 29 on opposite sides of the upper spacing spool 14 and through apertures 30 on opposite sides of the insulating casing 10 so that they may be connected to a voltage source. It will, of course, be recognized that the contact member 11 may be heated to a steady state condition by other means. For example, an external heat source might be used.

Although the testing probe illustrated and described herein is capable of being applied for thermal conductivity testing applications generally, it was specifically developed for testing the quality of bonding of a thin, hard facing material to a die member. Therefore, the description of operation is made for this application.

As illustrated in Fig. 3, a bond is tested by placing a foil 31 of fusible material having a low melting point on a workpiece 32. The heating coil leads 27 and 28 are connected to a voltage source 35 for a sufficient period of time to cause the heating coil 24 to heat the contact member 11 to a steady state temperature which is sufficiently high to melt the foil 31, and the test probe is positioned on the foil 31 in such a manner that the biasing spring 17 determines the pressure between the contact member 11 and the foil 31. It will be seen that utilizing the probe in this manner will insure a constant or a given contact pressure regardless of the workpiece being tested, and a conducting coupling is provided between the workpiece 32 and the contact member of the probe.

The foil 31 of fusible material is preferably of Wood's alloy which has a melting point of 70 degrees centigrade and a higher thermal conductivity than would be found in non-metallic fluids.

The current generated by the thermocouple 18 is then observed on an instrument or meter 36 which is coupled to the leads 20 and 21. The meter or instrument is preferably such an instrument as a photoelectric recorder so that the rate at which the current generated by the thermocouple changes may be observed. One suitable photoelectric recorder for this purpose is manufactured and sold commercially by the Instrument Department of the General Electric Company, West Lynn, Massachusetts, under the title "General Electric-Photoelectric Recorder," Models 8CE1, 8CE2, 8CE3, and 8CE4. It has been found that the rate at which the current changes is a function of the thermal conductivity of the test piece 32 and the thermal conductivity is a function of the bond quality between a facing material 34 and a base material 33 of the test piece.

It is apparent from the above discussion that the provision of the fusible material 31 between the contact member 11 of the test probe and the workpiece 32 helps to maintain a constant thermal impedance between the probe and the piece. This effect is also assisted by providing the test probe with the biasing spring 17 and utilizing the probe in such a manner that the spring 17 determines the contact pressure between the probe and workpiece. Ordinarily, it is considered important to have the point of contact of a probe such as the one contemplated here as small as possible since a large area of contact might ordinarily be expected to cause a variable thermal impedance between the probe and the piece to be tested. It was found, however, in testing the bond between the two materials that the area of the contact between the contact member of a probe should be made large. The relationship established was that the diameter of the contact member 11 should be large compared to the depth of the bond below the contact surface (i.e., the thickness of the facing material 34). The ratio is preferably in the order of five or ten to one. The variability of thermal impedance which would ordinarily be expected to occur due to a large contact area between the test pieces was found to be overcome by establishing a constant pressure and utilizing a fluid coupling between the probe contact member 11 and the test piece 32.

The best results are obtained if the contacting surface of the contact member 11 and the shape of the surface of the test piece 32 are matched. Accordingly, the probe illustrated in Figs. 1, 2, and 3 is provided with a contact piece 11 having a flat lower or contacting surface to be used with flat test pieces. Fig. 4 illustrates a contact member 11 having elements of the probe which correspond to elements illustrated in the other figures numbered correspondingly for simplicity. The contact member 11 in Fig. 4, however, has a concave lower surface 37 which matches the curvature of a test piece 38 having a thin bonding 39 which is curved around a curved die member 40. Again, the fusible Wood's alloy 31 is shown between the contact member 11 and the test piece 38. The contact member 11 illustrated in Fig. 4 is shown only to illustrate one of the many configurations of probe members which could be used for different shaped test pieces.

The particular material chosen for the contact member 11 of the test probe 9 was copper since it combines a high specific heat with a high thermal conductivity. A material with a high specific heat was chosen to give a heat source with ample heat energy to melt foil 31 and supply the test piece (workpiece) with the required heat. A high thermal conductivity of the material is a desirable factor since it was desired to obtain a high rate of heat exchange between the contact member of the probe 11 and the test piece 32 in order to have a good measurable quantity of current change shown on the recording instrument. The rate at which the heat flows between the contact member 11 of the test probe and the workpiece 32 is a measure of bond quality for the reason that a poor bond provides an insulating medium between the surface material 34 and the backing 33. If the bond is of good quality, heat will flow readily to both surface material 34 of the bond and to the backing material 33 thereof, whereas if the bond between the two materials is poor, heat will be dissipated from the copper contact member 11 at a rather slow rate due to the fact that the surface bond material 34 will be effectively the only heat absorbing member.

It will be seen that the objects of this invention have been accomplished by providing a probe for testing the thermal conductivity of materials and fabricated parts from a single contact point wherein an optimum contact area between the test probe and the test piece is provided and, at the same time, a constant and given pressure will be applied between the two pieces regardless of the workpiece used. These features insure a constant thermal impedance between the probe and the piece to be tested.

While a particular embodiment of the invention has been shown, it will be understood that the invention is not limited thereto since many modifications both in the circuit arrangement and the instrumentalities employed may be made. It is contemplated that the appended claims shall cover any such modifications as fall within the true spirit and scope of this invention.

What we claim as new and desire to secure by Letters Patent of the United States is:

1. A thermal conductivity testing probe for testing the thermal conductivity of a test piece and having a fusible material having a high, constant, thermal conductivity positioned between the probe and the workpiece to maintain a constant thermal impedance between said probe and said workpiece comprising a casing member, a metallic contact member movably held within one end of said casing member for engagement with the fusible material, spring biasing means positioned within said casing in such a manner that said contact member is biased outwardly away from said casing member, a heating coil positioned within said casing member in heat exchange relationship with said contact member having leads for energization from an electrical voltage source whereby the fusible material is liquefied by contact with said contact member, heat responsive current generating means in intimate contact with said contact member to generate an electric current in accordance with the variations of the temperature thereof, and a rate recording current measuring instrument for producing an output indication of the rate of change of current generated by said current generating means, said current generating means having conducting leads for connection to said rate recording instrument whereby the rate of change of heat flow between said contact member and said test piece may be observed.

2. A thermal conductivity testing probe for testing the thermal conductivity of a test piece and having a fusible material having a high, constant, thermal conductivity positioned between the probe and the workpiece to maintain a constant thermal impedance between said probe and said workpiece comprising a casing member, a metallic contact member movably held within one end of said casing member for engagement with the fusible material, said metallic contact member having a face contact portion of the configuration of the surface of the workpiece being tested, spring biasing means positioned within said casing in such a manner that said contact member is biased outwardly away from said casing member, a heating coil positioned within said casing member in heat exchange relationship with said contact member having leads for energization from an electrical voltage source whereby the fusible material is liquefied by contact with said contact member, heat responsive current generating means in intimate contact with said contact member to generate an electric current in accordance with the variations of the temperature thereof, and a rate recording current measuring instrument for producing an output indication of the rate of change of current developed by said current generating means, said current generating means having conducting leads for connection to said rate recording instrument whereby the rate of change of heat flow between said contact member and said test piece may be observed.

References Cited in the file of this patent

UNITED STATES PATENTS

| | | |
|---|---|---|
| 2,323,715 | Kuehni | July 6, 1943 |
| 2,587,705 | De Forest | Mar. 4, 1952 |
| 2,750,791 | Hanysz et al. | June 19, 1956 |